United States Patent
Shiga et al.

(10) Patent No.: US 9,353,212 B2
(45) Date of Patent: *May 31, 2016

(54) GOLF BALL POLYURETHANE COMPOSITION AND GOLF BALL

(75) Inventors: Kazuyoshi Shiga, Kobe (JP); Ryo Murakami, Kobe (JP); Toshiyuki Tarao, Kobe (JP); Takahiro Shigemitsu, Kobe (JP)

(73) Assignee: DUNLOP SPORTS CO. LTD., Kobe-Shi (JP)

( * ) Notice: Subject to any disclaimer, the term of this patent is extended or adjusted under 35 U.S.C. 154(b) by 256 days.

This patent is subject to a terminal disclaimer.

(21) Appl. No.: 13/592,442

(22) Filed: Aug. 23, 2012

(65) Prior Publication Data
US 2013/0053174 A1 Feb. 28, 2013

(30) Foreign Application Priority Data
Aug. 24, 2011 (JP) .................................. 2011-183082

(51) Int. Cl.
A63B 37/00 (2006.01)
C08G 18/75 (2006.01)
C08G 18/66 (2006.01)
C08G 18/48 (2006.01)

(52) U.S. Cl.
CPC .......... *C08G 18/757* (2013.01); *A63B 37/0003* (2013.01); *A63B 37/0043* (2013.01); *A63B 37/0049* (2013.01); *A63B 37/0051* (2013.01); *A63B 37/0058* (2013.01); *A63B 37/0062* (2013.01); *A63B 37/0064* (2013.01); *A63B 37/0065* (2013.01); *A63B 37/0069* (2013.01); *A63B 37/0073* (2013.01); *A63B 37/0074* (2013.01); *A63B 37/0078* (2013.01); *A63B 37/0094* (2013.01); *C08G 18/4854* (2013.01); *C08G 18/6607* (2013.01); *C08G 18/6674* (2013.01); *A63B 37/0039* (2013.01); *A63B 37/0063* (2013.01)

(58) Field of Classification Search
None
See application file for complete search history.

(56) References Cited

U.S. PATENT DOCUMENTS

| | | | | |
|---|---|---|---|---|
| 6,152,836 A * | 11/2000 | Bradley | .............. | A63B 37/0003 473/378 |
| 6,867,279 B2 * | 3/2005 | Wu | .................................. | 528/61 |
| 2003/0203771 A1 | 10/2003 | Rosenberg et al. | | |
| 2004/0010096 A1 | 1/2004 | Rajagopalan et al. | | |
| 2005/0124777 A1 | 6/2005 | Rosenberg et al. | | |
| 2007/0072701 A1 | 3/2007 | Nagasawa | | |
| 2009/0124427 A1 | 5/2009 | Sullivan et al. | | |
| 2009/0143169 A1 | 6/2009 | Shiga et al. | | |
| 2010/0216905 A1 | 8/2010 | Kuwamura et al. | | |
| 2010/0248863 A1 * | 9/2010 | Sullivan | ............. | A63B 37/0031 473/376 |
| 2011/0028642 A1 | 2/2011 | Xie et al. | | |
| 2011/0033712 A1 | 2/2011 | Xie et al. | | |
| 2011/0098133 A1 * | 4/2011 | Shiga et al. | .................... | 473/374 |
| 2012/0021853 A1 * | 1/2012 | Tarao et al. | .................... | 473/374 |
| 2012/0052983 A1 * | 3/2012 | Tarao | ............................ | 473/374 |
| 2013/0053179 A1 * | 2/2013 | Tarao et al. | .................... | 473/372 |
| 2013/0053182 A1 * | 2/2013 | Tarao et al. | .................... | 473/377 |
| 2013/0053184 A1 * | 2/2013 | Shiga et al. | .................... | 473/378 |

FOREIGN PATENT DOCUMENTS

| | | |
|---|---|---|
| JP | 60-29156 A | 2/1985 |
| JP | 2005-28153 A | 2/2005 |
| JP | 2005-523958 A | 8/2005 |
| JP | 2007-90065 A | 4/2007 |
| JP | 2008-195955 A | 8/2008 |
| JP | 2009-131508 A | 6/2009 |
| JP | 2011-516692 A | 5/2011 |
| JP | 2011-518898 A | 6/2011 |
| JP | 2011140618 * | 7/2011 |
| WO | WO 2009/051114 A1 | 4/2009 |

OTHER PUBLICATIONS

English translation of Japanese Office Action dated Mar. 10, 2015, for Japanese Application No. 2011-183082.
English translation of Decision of Rejection mailed Nov. 24, 2015, in Japanese Patent Application No. 2011-183082.

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball polyurethane composition excellent in resilience. Another object of the present invention is to provide a golf ball excellent in a shot feeling and resilience. The present invention provides a golf ball polyurethane composition comprising, as a resin component, a polyurethane elastomer including a polyisocyanate with one alicyclic hydrocarbon structure having 3 or more carbon atoms as a constituting component, and having a storage modulus E' (Pa) and a loss modulus E" (Pa) satisfying a following expression;

$$\log(E'/E''^2) \geq -6.53$$

when measured in a tensile mode using a dynamic viscoelasticity measuring apparatus.

12 Claims, 1 Drawing Sheet

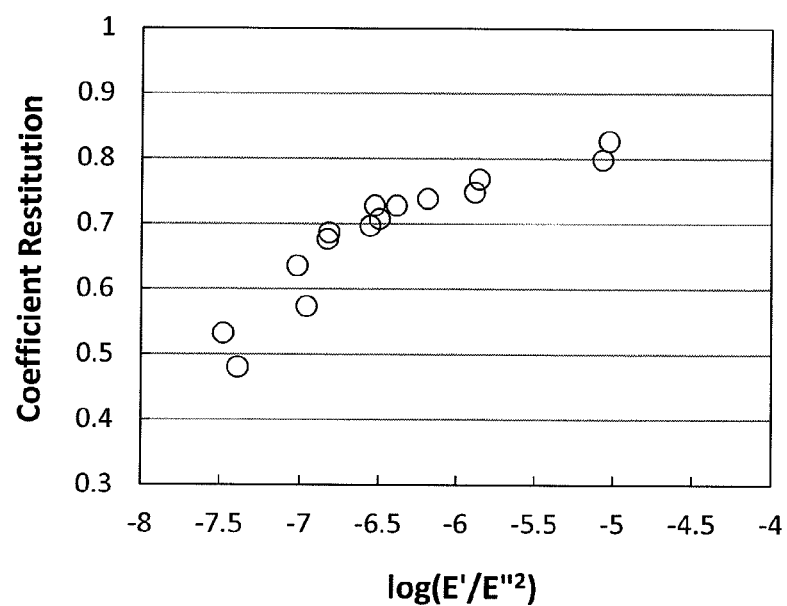

GOLF BALL POLYURETHANE COMPOSITION AND GOLF BALL

FIELD OF THE INVENTION

The present invention relates to a golf ball polyurethane composition and a golf ball using the same.

DESCRIPTION OF THE RELATED ART

As a golf ball construction, a one-piece golf ball comprising a golf ball body, a two-piece golf ball comprising a core and a cover, a three-piece golf ball comprising a core consisting of a center and a single-layered intermediate layer covering the center, and a cover covering the core, and a multi-piece golf ball comprising a core consisting of a center and at least two intermediate layers covering the center, and a cover covering the core are known. Polyurethanes are widely used as a material constituting a cover of golf balls. Use of the polyurethanes provides the golf ball excellent in a shot feeling and controllability.

JP2005-523958T discloses a golf ball comprising a core and a cover, the cover comprising a polyurethane elastomer, the polyurethane elastomer comprising the reaction product of (a) a HDI-terminated prepolymer comprising the reaction product of one or more polyols with a stoichiometric excess of HDI diisocyanate monomer wherein unreacted HDI diisocyanate monomer is removed to less than about 2 wt. % and (b) at least one hydroxy or amine functional chain extender.

JP2008-195955A discloses a golf ball comprising a core and a cover, the cover comprising a polyurethane elastomer, the polyurethane elastomer comprising the reaction product of (a) a HDI-terminated prepolymer comprising the reaction product of one or more polyols selected from the group consisting of polyesters, polycaprolactones, polyethers, polycarbonates, and hydrocarbon polyols with a stoichiometric excess of HDI diisocyanate monomer and prepared without using a solvent wherein unreacted HDI diisocyanate monomer is removed to less than about 2 wt. % and (b) at least one hydroxy or amine functional chain extender.

JP2007-90065A discloses a golf ball comprising a core and one or more cover layer which encloses the core, the ball being characterized in that at least one cover layer is made primarily of a thermoplastic polyurethane elastomer obtained by a curing reaction of a polyurethane base liquid containing a polyol component and a polyisocyanate component, wherein the polyol component includes a copolymeric polycarbonate polyol.

JP2005-28153A discloses a multilayer golf ball formed, at least in part, from a polyurethane or polyurea composition. The polyurethane or polyurea composition may include at least one diisocyanate, at least one polyol(polyurethane) or amine-terminated moiety(polyurea), and at least one curing agent.

JP2009-131508A discloses a golf ball comprising a core and a cover covering the core, wherein the cover contains, as a resin component, polyurethane which is obtained using, as polyisocyanate component constituting the polyurethane, 4,4'-dicyclohexymethane diisocyanate having a mole ratio ((B)/(A)) of non-cis-structure molecule (B) to cis-structure molecule (A) in a range from 3/7 to 9/1. WO2009/051114A discloses a novel polyurethane material.

SUMMARY OF THE INVENTION

So far, cured products of rubber compositions have been used for cores of golf balls. However, the cured products of the rubber composition have a problem of not being recycled after molding the cores since the cured products of the rubber compositions have no thermoplasticity. Although molding cores from thermoplastic resins capable of injection molding has been recently studied, a soft material with an excellent resilience like the cured products of the rubber compositions has not been obtained.

The present invention has been achieved in view of the above circumstances. An object of the present invention is to provide a golf ball polyurethane composition capable of injection molding with an excellent resilience. Another object of the present invention is to provide a golf ball with an excellent shot feeling and resilience.

The present invention provides a golf ball polyurethane composition comprising, as a resin component, a polyurethane elastomer including a polyisocyanate with one alicyclic hydrocarbon structure having 3 or more carbon atoms as a constituting component, and having a storage modulus E' (Pa) and a loss modulus E" (Pa) satisfying a following expression;

$$\mathrm{Log}(E'/E'')\geq -6.53$$

when measured in a tensile mode using a dynamic viscoelasticity measuring apparatus.

It is thought that the resilience of the golf ball polyurethane composition becomes higher as the storage modulus E' (Pa) becomes larger or as the loss modulus E" (Pa) becomes smaller. In addition, hardness also increases as the storage modulus E' (Pa) becomes larger. In the above described expression, since the denominator is the second power of the loss modulus E" whereas the numerator is the first power of the storage modulus E', the above described expression means that reducing the loss modulus E" provides a larger improvement effect on the resilience than increasing the storage modulus E' to enhance the hardness. The golf ball polyurethane composition of the present invention has better resilience when the storage modulus E' (Pa) and the loss modulus E" (Pa) satisfy the above formula. The golf ball having a constituent member formed from such golf ball polyurethane composition is excellent in shot feeling and resilience.

The present invention further provides a golf ball having a constituting member formed from the polyurethane composition of the present invention. The golf ball of the present invention includes, for example, a golf ball comprising a core composed of at least one layer and a cover covering the core, wherein the at least one layer of the core is formed from the golf ball polyurethane composition of the present invention, and a one-piece golf ball comprising a golf ball body formed from the golf ball polyurethane composition of the present invention.

According to the present invention, the golf ball polyurethane composition capable of injection molding with an excellent resilience is obtained. The golf ball using the golf ball polyurethane composition of the present invention provides an excellent shot feeling and resilience.

BRIEF DESCRIPTION OF THE DRAWINGS

FIG. 1 is a graph showing a relation between coefficient of Restitution and log (E'/E"$^2$).

DESCRIPTION OF THE PREFERRED EMBODIMENT

The present invention provides a golf ball polyurethane composition comprising, as a resin component, a polyurethane elastomer including a polyisocyanate with one alicyclic hydrocarbon structure having 3 or more carbon atoms as a constituting component, and having a storage modulus E' (Pa) and a loss modulus E" (Pa) satisfying the following expression;

$$\log(E'/E''^2) \geq -6.53$$

when measured in a tensile mode using a dynamic viscoelasticity measuring apparatus. $\log(E'/E''^2)$ is preferably −6.50 or more. Further, $\log(E'/E''^2)$ is, but not limited to, preferably −3.00 or less, more preferably −3.20 or less, because when the $\log(E/E''^2)$ is −3.00, the coefficient of Restitution almost reaches the maximum value of 1. $\log(E'/E''^2)$ is controlled by choosing appropriately the kinds, contents, or the like of a polyisocyanate component, a polyol component or a chain extender component of the polyurethane elastomer which will be explained below. In addition, log in the above expression is common logarithm.

The storage modulus E' (Pa) is preferably $1 \times 10^5$ Pa or more, more preferably $2 \times 10^5$ Pa or more, and is preferably $50 \times 10^7$ Pa or less, more preferably $49 \times 10^7$ Pa or less. If the storage modulus E' (Pa) is $1 \times 10^5$ Pa or more, a shape of a golf ball is maintained. If the storage modulus E' (Pa) is $50 \times 10^7$ Pa or less, the shot feeling becomes better. The loss modulus E" (Pa) is preferably $1 \times 10^3$ Pa or more, more preferably $2 \times 10^3$ Pa or more, and is preferably $2.1 \times 10^7$ Pa or less, more preferably $2.05 \times 10^7$ Pa or less. If the loss modulus E" (Pa) is $1 \times 10^3$ Pa or more, the durability becomes better. If the loss modulus E" (Pa) is $2.1 \times 10^7$ Pa or less, the resilience becomes better.

As the conditions of measuring the dynamic viscoelasticity, the conditions of oscillation frequency: 10 Hz, the temperature: 0° C., and measuring strain: 0.05% are employed. The contact time between the golf ball and a collision bar (cylindrical metallic material) is 500 micro seconds in measuring coefficient of restitution at 40 m/s. If this is considered as a deformation of one cycle, this deformation corresponds to a deformation at the several thousands Hertz. Based on the frequency and temperature superposition principle of the general polyurethane, the dynamic viscoelasticity measured at the conditions of temperature: room temperature and oscillation frequency: several thousands Hertz corresponds to the dynamic viscoelasticity measured at the conditions of temperature: 0° C. and oscillation frequency: 10 Hz. It is thought that the reason why the strain is 0.05% is that the strain can be expressed by a liner strain of 0.05% because the strain in measuring the coefficient of restitution is in the range of a liner strain.

The golf ball polyurethane composition of the present invention contains a polyurethane elastomer as a resin component. The polyurethane elastomer is a reaction product of a polyisocyanate component and a polyol component, and is an elastomer having plurality of urethane bonds in the molecular chain. If necessary, a polyamine component may further be allowed to react.

The polyurethane elastomer preferably includes the polyisocyanate with one alicyclic hydrocarbon structure having 3 or more carbon atoms as the polyisocyanate component. As the alicyclic hydrocarbon structure having 3 or more carbon atoms, an alicyclic hydrocarbon structure having 3 to 30 carbon atoms is preferred. Examples thereof are a cyclopropane ring, a cyclobutane ring, a cyclopentane ring, a cyclohexane ring, a cycloheptane ring, a cyclooctane ring and the like. Further, at least one of hydrogens in the alicyclic hydrocarbon structure may be substituted with a halogen atom, a hydroxyl group, an alkyl group, or the like.

Specific examples of the polyisocyanate with one alicyclic hydrocarbon structure having 3 or more carbon atoms include an alicyclic polyisocyanate with one alicyclic hydrocarbon structure such as 1,3-cyclohexane diisocyanate, 1,4-cyclohexane diisocyanate, 1,3-di(isocyanatomethyl)cyclohexane, 1,4-di(isocyanatomethyl)cyclohexane, isophorone diisocyanate (IPDI), norbornene diisocyanate (NBDI), and the like.

The polyurethane elastomer used in the present invention preferably contains 1,4-bis(isocyanatomethyl)cyclohexane as the polyisocyanate component. By using 1,4-bis(isocyanatomethyl)cyclohexane, a resilience of the obtained golf ball enhances. It is preferable that the polyisocyanate component essentially consists of 1,4-bis(isocyanatomethyl)cyclohexane, but other polyisocyanates may be used in combination, to the extent that the effect of the present invention does not deteriorate. In the case using other polyisocyanates in combination, the content of 1,4-bis(isocyanatomethyl)cyclohexane in the polyisocyanate component is preferably 50 mole % or more, more preferably 70 mole % or more, even more preferably 80 mole % or more, in a molar ratio of isocyanate groups of 1,4-bis(isocyanatomethyl)cyclohexane to all isocyanate groups of the polyisocyanate components.

1,4-bis(isocyanatomethyl)cyclohexane includes configuration isomers of a trans-isomer and a cis-isomer. In the present invention, 1,4-bis(isocyanatomethyl)cyclohexane containing the trans-isomer in a ratio of 80 mole % or more is preferably used. If 1,4-bis(isocyanatomethyl)cyclohexane containing the trans-isomer in a ratio of 80 mole % or more is used, the resilience of the obtained golf ball becomes higher. From this aspect, the ratio of the trans-isomer is preferably 82 mole % or more, more preferably 85 mole % or more. The ratio of trans-isomer in 1,4-bis(isocyanatomethyl)cyclohexane can be measured, for example, by $^{13}$C-NMR (JOEL α-400 NMR 100 MHz available from JOEL Ltd.). Solvents for preparing samples include deuterated solvents such as chloroform, methanol, dimethyl sulfoxide, preferably includes deuterated chloroform. The measuring temperature ranges from 20° C. to 80° C., and is preferably 23° C.

The polyisocyanate component that can be used with 1,4-bis(isocyanatomethyl)cyclohexane is not limited, as long as it has at least two isocyanate groups. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), 1,3-di(isocyanatomethyl)cyclohexane, hexamethylene diisocyanate (HDI), isophorone diisocyanate (IPDI), and norbornene diisocyanate (NBDI). These may be used either alone or as a mixture of at least two of them.

As a high-molecular weight polyol component constituting the polyurethane elastomer for use in the present invention, preferably used is a polyol having a number average molecular weight ranging from 1,000 to 3,000. The polyol having a number average molecular weight ranging from 1,000 to 3,000 forms a soft segment and imparts the softness to the polyurethane. If the number average molecular weight of the high-molecular weight polyol is less than 1,000, the obtained polyurethane may become hard. If the number average molecular weight of the high molecular weight polyol is 3,000 or less, it is possible to provide a golf ball with a lower spin rate on driver shots.

The number average molecular weight of the high-molecular weight polyol component can be measured by Gel permeation Chromatography (GPC) using two columns of TSK- GEL SUPREH 2500 (TOSOH Corporation) as a column, polystyrene as a standard material, and tetrahydrofuran as an eluate.

The high-molecular weight polyol component having a number average molecular weight from 1,000 to 3,000 is preferably a polymer polyol. The polymer polyol is a polymer obtained by polymerizing a low molecular compound, and has plurality of hydroxyl groups. Among them, a polymer diol having two hydroxyl groups is more preferable. Use of the polymer diol provides a linear thermoplastic polyurethane and facilitates the molding of the obtained polyurethane into the constituting member of the golf ball.

Examples of the polymer polyol having a number average molecular weight from 1,000 to 3,000 include a polyether polyol such as polyoxyethylene glycol (PEG), polyoxypropylene glycol (PPG), and polytetramethylene ether glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them. Among them, as the polymer polyol component, polytetramethylene ether glycol is preferably used. Use of the polytetramethylene ether glycol makes it possible to control the spin rates on the driver shots and the approach shots at the higher level.

The polymer polyol constituting the polyurethane elastomer used in the present invention preferably has a hydroxyl value of 561 mgKOH/g or less, more preferably 173 mgKOH/g or less and preferably has a hydroxyl value of 94 mgKOH/g or more, more preferably 112 mgKOH/g or more, even more preferably 132 mgKOH/g or more. The hydroxyl value of the polyol component can be measured, for example, by an acetylation method according to JIS K1557-1.

The polyurethane elastomer may further have a chain extender as a constituent component, unless the effect of the preset invention deteriorates. The chain extender includes a low-molecular weight polyol or a low-molecular weight polyamine. Examples of the low-molecular weight polyol may include a diol such as ethylene glycol, diethylene glycol, triethylene glycol, propanediol (e.g., 1,2-propanediol and 1,3-propanediol), dipropylene glycol, butanediol (e.g., 1,2-butanediol, 1,3-butanediol, 1,4-butanediol, and 2,3-butanediol), neopentyl glycol, pentanediol, hexanediol, heptanediol, octanediol, and 1,4-cyclohexane dimethylol; a triol such as glycerin, trimethylol propane, and hexanetriol; a tetraol or a hexanol such as pentaerythritol and sorbitol.

The low-molecular weight polyamine that can be used as a chain extender may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, toluenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly(aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The chain extender preferably has a molecular weight of 400 or less, more preferably 350 or less, even more preferably less than 200 and preferably has a molecular weight of 30 or more, more preferably 40 or more, even more preferably 45 or more. If the molecular weight is too large, it is difficult to distinguish the chain extender from the high-molecular weight polyol (polymer polyol) constituting a soft segment of the polyurethane. "Low molecular weight polyol" and "Low molecular weight polyamine" are low molecular compounds which do not have a molecular weight distribution, and are distinguished from the high-molecular weight polyol (polymer polyol) having a number average molecular weight from 1,000 to 3,000 obtained by polymerization of the low molecular weight compound.

The polyurethane elastomer used in the present invention has no limitation on the constitutional embodiments thereof. Examples of the constitutional embodiments are the embodiment where the polyurethane elastomer consists of the polyisocyanate component, and the polyol component having a number average molecular weight from 1,000 to 3,000, and the embodiment where the polyurethane consists of the polyisocyanate component, the polyol component having a number average molecular weight from 1,000 to 3,000, and the chain extender component.

The polyurethane elastomer used in the present invention may be either thermoplastic polyurethane elastomer or thermosetting polyurethane elastomer (two-component curing type polyurethane elastomer). The thermoplastic polyurethane elastomer is a polyurethane elastomer exhibiting plasticity by heating and generally means a polyurethane elastomer having a linear chain structure of a high-molecular weight to a certain extent. On the other hand, the thermosetting polyurethane elastomer (two-component curing type polyurethane elastomer) is a polyurethane elastomer obtained by polymerization through a reaction between a relatively low-molecular weight urethane prepolymer and a chain extender (curing agent). The thermosetting polyurethane elastomer includes a polyurethane elastomer having a linear chain structure or polyurethane elastomer having a three-dimensional crosslinked structure depending on a number of a functional group of the prepolymer or the chain extender (curing agent) to be used. In the present invention, the thermoplastic polyurethane elastomer is preferable.

Examples of a method for synthesizing the polyurethane elastomer include a one-shot method and a prepolymer method. The one-shot method is a method of reacting a polyisocyanate component, a polyol component or the like at once. The prepolymer method is a method of reacting a polyisocyanate component and a polyol component or the like in multiple steps. For example, a relatively low-molecular weight urethane prepolymer is synthesized, followed by further polymerization to have a higher-molecular weight. The polyurethane used in the present invention is preferably produced by the prepolymer method.

As an example of producing the polyurethane elastomer by the prepolymer method, the following case will be described in detail, wherein an isocyanate group terminated urethane prepolymer is synthesized and then polymerized with the chain extender.

First, a polyisocyanate component is subjected to a urethane reaction with a polymer polyol component to synthesize an isocyanate group terminated urethane prepolymer. In this case, the charging ratio of the polyisocyanate component to the polymer polyol component is, preferably 1 or larger, more preferably 1.2 or larger, and even more preferably 1.5 or larger, and is preferably 10 or smaller, more preferably 9 or smaller, and even more preferably 8 or smaller in a molar ratio (NCO/OH) of the isocyanate group (NCO) contained in the polyisocyanate component to the hydroxyl group (OH) contained in the polymer polyol component.

The temperature at which the prepolymer reaction is carried out is preferably 10° C. or higher, more preferably 30° C. or higher, and even more preferably 50° C. or higher, and is preferably 200° C. or lower, more preferably 150° C. or lower, and even more preferably 100° C. or lower. The reaction time for the prepolymer reaction is preferably 10 minutes or longer, more preferably 1 hour or longer, and even more preferably 3 hours or longer, and is preferably 32 hours or shorter, more preferably 16 hours or shorter, and even more preferably 8 hours or shorter.

Next, the obtained isocyanate group terminated urethane prepolymer is subjected to a chain extension reaction with the chain extender component to obtain the polyurethane elastomer having a high-molecular weight. In this case, the charging ratio of the isocyanate group terminated urethane prepolymer to the chain extender component is preferably 0.9 or larger, more preferably 0.92 or larger, and even more preferably 0.95 or larger, and is preferably 1.1 or smaller, more preferably 1.08 or smaller, and even more preferably 1.05 or smaller in a molar ratio (NCO/OH or $NH_2$) of the isocyanate group (NCO) contained in the isocyanate group terminated urethane prepolymer to the hydroxyl group (OH) or the amino group ($NH_2$) contained in the chain extender component.

The temperature at which the chain extension reaction is carried out is preferably 10° C. or higher, more preferably 30° C. or higher, and even more preferably 50° C. or higher, and is preferably 220° C. or lower, more preferably 170° C. or lower, and even more preferably 120° C. or lower. The reaction time for the chain extension reaction is preferably 10 minutes or longer, more preferably 30 minutes or longer, and even more preferably 1 hour or longer, and is preferably 20 days or shorter, more preferably 10 days or shorter, and even more preferably 5 days or shorter.

Both of the prepolymer reaction and the chain extension reaction are preferably conducted in an atmosphere of dry nitrogen.

In synthesizing the polyurethane elastomer, a publicly known catalyst may be used. Examples of the catalyst include a monoamine such as triethylamine, and N,N-dimethylcyclohexylamine; a polyamine such as N,N,N',N'-tetramethylethylenediamine, and N,N,N',N'',N''-pentamethyldiethylenetriamine; a cyclic diamine such as 1,8-diazabicyclo-[5.4.0]-7-undecene (DBU), triethylenediamine; a tin-based catalyst such as dibutyl tin dilaurylate, and dibutyl tin diacetate. These catalysts may be used solely, or two or more of these catalysts may be used in combination. Among these catalysts, a tin-based catalyst such as dibutyl tin dilaurylate, and dibutyl tin diacetate are preferable, and in particular, dibutyl tin dilaurylate is preferably used.

The polyurethane composition used in the present invention preferably contains only the polyurethane elastomer as the resin composition, but may further contain ionomer resins or thermoplastic elastomers, as long as they do not impair the effect of the present invention. In this case, the content of the polyurethane elastomer in the resin component is preferably 50 mass % or more, more preferably 60 mass % or more, even more preferably 70 mass or more in the resin component. Especially, the content of the polyurethane elastomer using 1,4-bis(isocyanatomethyl)cyclohexane in the resin component is preferably 50 mass % or more, more preferably 60 mass % or more, even more preferably 70 mass % or more.

Examples of the ionomer resin include one prepared by neutralizing at least a part of carboxyl groups in a copolymer composed of an olefin and an α,β-unsaturated carboxylic acid having 3 to 8 carbon atoms with a metal ion; one prepared by neutralizing at least a part of carboxyl groups in a ternary copolymer composed of an olefin, an α,β-unsaturated carboxylic acid having 3 to 8 carbon atoms, and an α,β-unsaturated carboxylic acid ester with a metal ion; or a mixture of these two. As the olefin, an olefin having 2 to 8 carbon atoms is preferred. Examples thereof include ethylene, propylene, butene, pentene, hexene, heptene, octene, and the like, and typically preferred is ethylene. Examples of the α,β-unsaturated carboxylic acid include acrylic acid, methacrylic acid, fumaric acid, maleic acid, crotonic acid, or the like. In particular, acrylic acid and methacrylic acid are preferable. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Examples of the neutralizing metal ion are; monovalent metal ions such as sodium, potassium, and lithium; divalent metal ions such as magnesium, calcium, zinc, barium, and cadmium; trivalent metal ions such as aluminum; or other metal ions such as tin and zirconium. In particular, sodium ion, zinc ion, and magnesium ion are preferably used in view of the resilience and durability of the golf ball.

Specific examples of the ionomer resin include "Himilan (registered trade mark)" available from MITSUI-DUPONT POLYCHEMICAL CO., LTD, "Surlyn (registered trade mark)" available from DUPONT CO, and "Iotek(registered trade mark)" available from Exxon Co.

Specific examples of the thermoplastic elastomers are a thermoplastic polyamide elastomer having a commercial name of "Pebax (registered trademark) (e.g. "Pebax 2533")" commercially available from Arkema K. K.; a thermoplastic polyurethane elastomer having a commercial name of "Elastollan (registered trademark) (e.g. "Elastollan NY85A")" commercially available from BASF Japan Co.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic styrene elastomer having a commercial name of "Rabalon (registered trademark) (e.g. "Rabalon T3221C")" commercially available from Mitsubishi Chemical Corporation. The ionomer resins and the thermoplastic elastomers can be used solely or as a mixture of at least two of them. When using the thermoplastic elastomers in combination, thermoplastic polyurethane elastomers not having 1,4-bis(isocyanatomethyl)cyclohexane as a polyisocyanate component is preferably used in combination.

The golf ball polyurethane composition used in the present invention may contain a pigment component such as a white pigment (for example, titanium oxide) and a blue pigment, a weight adjusting agent such as calcium carbonate and barium sulfate, a dispersant, an antioxidant, an ultraviolet absorber, a light stabilizer, a fluorescent material or a fluorescent brightener. In the case of blending additives to the golf ball polyurethane composition, the golf ball polyurethane composition blended with the additives should satisfy the properties of log $(E'/E''^2)$, the rebound resilience, and slab hardness.

The content of the white pigment (for example, titanium oxide) is preferably 0.5 part by mass or more, more preferably 1 part by mass or more, and is preferably 10 parts by mass or less, more preferably 8 parts by mass or less based on 100 parts by mass of the resin component. The white pigment in an amount of 0.5 part by mass or more can impart opacity to the polyurethane composition, while the white pigment in an amount of more than 10 parts by mass may lower the durability of the obtained constituting member of the golf ball.

The golf ball polyurethane composition used in the present invention preferably has a slab hardness of 18 or more, more preferably 19 or more, even more preferably 20 or more, and preferably has a slab hardness of 60 or less, more preferably 56 or less, even more preferably 53 or less, in Shore D hardness. If the slab hardness is too low, the resilience may be lowered, while if the slab hardness is too high, the shot feeling may deteriorate.

The golf ball polyurethane composition used in the present invention preferably has rebound resilience of 54% or more, more preferably 56% or more, and even more preferably 57% or more. Use of the golf ball polyurethane composition having rebound resilience of 54% or more provides a golf ball excellent in resilience (flying distance). The rebound resilience is measured by molding the golf ball polyurethane composition into a sheet form. The method for the measurement is described later.

The golf ball polyurethane composition used in the present invention preferably has melt viscosity (190° C.) measured by a flow tester of 1 Pa·s or more, more preferably 10 Pa·s or more, and preferably has melt viscosity of $1 \times 10^5$ Pa·s or less, more preferably $5 \times 10^4$ Pa·s or less. If the melt viscosity falls within the above range, injection molding into the constituent member becomes easier.

The golf ball of the present invention is not limited, as long as it comprises a constituent member formed from the golf ball polyurethane composition of the present invention. For example, in a one-piece golf ball, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least one intermediate layer disposed around the center, and a cover disposed around the core (including the three-piece golf ball mentioned above), any one of constituent members is formed from the above golf ball polyurethane composition. In one preferable embodiment, the golf ball comprises a core composed of at least one layer and a cover disposed around the core, wherein at least one layer of the core is formed from the golf ball polyurethane composition of the present invention. In another preferable embodiment, the golf ball body of the one-piece golf ball is formed from the golf ball polyurethane composition of the present invention. In particular, in one more preferable embodiment, a spherical body constituting at least a part of the golf balls such as the one-piece golf ball body, center, or core is formed from the golf ball polyurethane composition of the present invention. For example, in one preferable embodiment, the two-piece golf ball comprises a single-layered core and a cover disposed around the core, wherein the single-layered core is formed from the golf ball polyurethane composition of the present invention. Also, in another more preferable embodiment, the multi-piece golf ball comprises a core having a center and at least one intermediate layer disposed around the center, and a cover disposed around the core, wherein the center is formed from the golf ball polyurethane composition of the present invention.

In the following, the present invention will be explained based on the two-piece golf ball that comprises a core and a cover disposed around the core, wherein the core is formed from the golf ball polyurethane composition of the present invention. However, the present invention is not limited to this embodiment.

The core, for example, is molded by injection molding the golf ball polyurethane composition of the present invention. Specifically, it is preferred that the golf ball polyurethane composition heated and melted at the temperature ranging from 160° C. to 260° C. is charged into a mold held under the pressure of 1 MPa to 100 MPa for 1 second to 100 seconds, and after cooling for 30 seconds to 300 seconds, the mold is opened.

The core preferably has a spherical shape. If the core does not have a spherical shape, the cover does not have a uniform thickness. As a result, there exist some portions where the performance of the cover is lowered.

The core preferably has the diameter of the 39.00 mm or more, more preferably 39.25 mm or more, and even more preferably 39.50 mm or more, and preferably has the diameter of 42.37 mm or less, more preferably 42.22 mm or less, and even more preferably 42.07 mm or less. If the core has the diameter of 39.00 mm or more, the thickness of the cover does not become too thick and thus the resilience becomes better. On the other hand, if the core has the diameter of 42.37 mm or less, the thickness of the cover does not become too thin, and hence a protection ability of the cover is sufficiently provided.

When the core has a diameter from 39.00 mm to 42.37 mm, a compression deformation amount (shrinking deformation amount of the core along the compression direction) of the core when applying a load from 98 N as an initial load to 1275 N as a final load is preferably 1.85 mm or more, more preferably 2.43 mm or more, and is preferably 10.34 mm or less, more preferably 9.43 mm or less, even more preferably 9.00 mm or less. If the compression deformation amount is 1.85 mm or more, the shot feeling of the golf ball becomes better. If the compression deformation amount is 10.34 mm or less, the resilience of the golf ball becomes better.

The surface hardness of the core is preferably 20 or larger, more preferably 25 or larger, and even more preferably 30 or larger in shore D hardness, and is preferably 70 or smaller, more preferably 69 or smaller in shore D hardness. If the surface hardness is 20 or larger in shore D hardness, the core does not become so soft and the better resilience is obtained. If the surface hardness of the core is 70 or smaller in shore D hardness, the core does not become so hard and the better shot feeling is obtained.

The center hardness of the core is preferably 20 or larger, more preferably 22 or larger, and even more preferably 24 or larger in Shore D hardness. If the center hardness is less than 20 in shore D hardness, the core becomes so soft that the resilience of the golf ball tends to become lower. Further, the center hardness of the core is preferably 50 or smaller, more preferably 48 or smaller, and even more preferably 46 or smaller in Shore D hardness. If the center hardness is more than 50 in shore D hardness, the core becomes too hard, resulting in the poor shot feeling. In the present invention, the center hardness of the core is the hardness measured with the Shore D type spring hardness tester at the central point of a cut plane of a core which has been cut into two halves.

The core preferably contains a filler. The filler is mainly blended as a weight adjusting agent in order to adjust density of the golf ball as the final product within the range of 1.0 to 1.5 g/cm$^3$, and may be blended as required. Examples of the filler include an inorganic filler such as zinc oxide, barium sulfate, calcium carbonate, magnesium oxide, tungsten powder, and molybdenum powder. The amount of the filler to be blended in the composition is preferably 0.5 part or more, more preferably 1.0 part or more, and is preferably 30 parts or less, more preferably 20 parts or less based on 100 parts of the resin component by mass. If the amount of the filler to be blended is less than 0.5 part by mass, it becomes difficult to adjust the weight, while if it is more than 30 parts by mass, the weight ratio of the resin component becomes small and the resilience tends to be lowered.

The cover of the golf ball of the present invention is preferably formed from a cover composition containing a resin component. The resin component includes, for example, various resins such as an ionomer resin, polyester resin, urethane resins such as a thermoplastic urethane resin or two-component curable urethane resin, polyamide resin or the like; and a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polyurethane elastomer having a commercial name of "Elastollan (registered trademark) (e.g. "Elastollan NY97A")" commercially available from BASF Japan Ltd.; a thermoplastic styrene elastomer having a commercial name of "Rabalon (registered trademark)" commercially available from Mitsubishi Chemical Corporation. These resin components are used solely or as a mixture of at least two of them.

The cover composition preferably contains the polyurethane resin (including polyurethane elastomer) or the ionomer resin, as the resin component. The content of the polyurethane resin or the ionomer resin in the resin component of the cover composition is preferably 50 mass % or more, more preferably 60 mass % or more, even more preferably 70 mass % or more.

In the present invention, in addition to the aforementioned resin component, the cover composition may further contain a pigment component such as a white pigment (for example, titanium oxide), a blue pigment, a red pigment, or the like; a weight adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 part by mass or more, it is possible to impart the opacity to the cover. If the amount of the white pigment is more than 10 parts by mass, the durability of the resultant cover may deteriorate.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

In the case of directly injection molding the cover composition, the cover composition extruded in the pellet form beforehand may be used for injection molding or the materials such as the resin components and the pigment may be dry blended, followed by directly injection molding the blended material. It is preferred to use upper and lower molds having a spherical cavity and pimples for forming a cover, wherein a part of the pimples also serves as a retractable hold pin. When molding the cover by injection molding, the hold pin is protruded to hold the core, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 to 5 seconds, and after cooling for 10 to 60 seconds, the mold is opened and the golf ball with the cover molded is taken out from the mold.

The cover usually has the concave portions called "dimple" formed on the surface thereof. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, roughly hexagonal shape, and another irregular shape. The shape of the dimples is employed solely or in combination at least two of them.

In the present invention, the thickness of the cover of the golf ball is preferably 2.0 mm or less, more preferably 1.6 mm or less, even more preferably 1.2 mm or less, most preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the wear resistance of the cover may deteriorate.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowering flying performance of the golf ball.

When the golf ball of the present invention has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. On the other hand, if the compression deformation amount is 4.0 mm or less, the resilience is enhanced.

The present invention is explained based on the embodiment where the golf ball polyurethane composition of the present invention is used for the core, but the golf ball polyurethane composition of the present invention may be used as the center, the intermediate layers, and the cover. If the center is formed from the golf ball polyurethane composition of the present invention, the intermediate layers may be formed from the resin components exemplified as the cover materials.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Slab Hardness (JIS A Hardness, Shore D Hardness)

Sheets with a thickness of about 2 mm were produced by hot press molding the golf ball polyurethane composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a JIS-A type spring hardness tester or a Shore D type spring hardness tester prescribed in ASTM-D2240.

(2) Melt Viscosity Measured by a Flow Tester

The melt viscosity of a pellet-form sample was measured with the following conditions by using a flow characteristics evaluation apparatus (Flow Tester CFT-500D, manufactured by SHIMADZU CORPORATION).
Measurement Conditions
Die length: 10 mm
Die diameter: 1 mm
Cylinder pressure: 3 MPa
Temperature: 190° C.

(3) Rebound Resilience (%)

A sheet with a thickness of about 2 mm was produced by a hot press molding the golf ball polyurethane composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50 RH %). Preparation of the test piece and the testing method are based on JIS K6255.

(4) Compression Deformation Amount (mm)

A compression deformation amount of the spherical body (a shrinking amount of the spherical body in the compression direction thereof), when applying a load from 98 N as an initial load to 1275 N as a final load to the spherical body, was measured. The compression deformation amount of spherical body No. 11 was defined as an index of 1.00, and the compression deformation amount of the spherical body was represented by converting the compression deformation amount of the spherical body into this index.

(5) Coefficient of Restitution

A 198.4 g of metal cylindrical object was forced to collide with each spherical body at a speed of 40 m/sec, and the speeds of the cylindrical object and the spherical body before and after the collision were measured. Based on these speeds and the mass of each object, coefficient of restitution for each spherical body was calculated. The measurement was conducted by using twelve spherical bodies for each spherical body, and the average value was regarded as the coefficient of restitution for the spherical body.

(6) Shot Feeling

An actual hitting test was carried out by ten amateur golfers (high skilled person) using a driver. Feeling at the shot was evaluated by each person according to the following criteria. Major result of the evaluations of ten golfers was employed as the result of the golf ball.
E (Excellent): Impact is small and feeling is good.
G (Good): Normal feeling.
P (Poor): Impact is large and feeling is poor.

(7) Measurement of Storage Modulus E' (Pa) and Loss Modulus E" (Pa)

The storage modulus E' (Pa) and the loss modulus E" (Pa) of the golf ball polyurethane composition were measured at the following conditions.
Apparatus: Viscoelasticity measuring apparatus Rheogel-E4000 available from UBM CO., Ltd.
Test piece: A sheet having a thickness of 2 mm was produced by a hot press molding the golf ball polyurethane composition and a test piece was cut out to have a width 4 mm and a length between the clamps of 20 mm.
Measuring mode: tensile mode
Measuring temp.: 0° C.
Oscillation frequency: 10 Hz
Measuring strain: 0.05%

Preparation of bis(isocyanatomethyl)cyclohexane

Preparation Example 1

As a raw material, 1,4-bis(aminomethyl)cyclohexane (manufactured by Mitsubishi Gas Chemical Company, Inc.) having a trans-isomer/cis-isomer ratio of 93/7 determined by $^{13}$C-NMR was used to perform cold/hot two-stage phosgenation method under normal pressure. Specifically, a stirring rod, a thermometer, a phosgene inlet tube, a dropping funnel, and a condenser tube were attached to a flask, and the flask was charged with 400 parts by mass of ortho dichlorobenzene. While the flask was cooled with cold water, the temperature in the flask was lowered to 10° C. or below, and 280 parts by mass of phosgene was introduced thereinto from the phosgene inlet tube. The dropping funnel was charged with a mixed solution of 100 parts by mass of 1,4-bis(aminomethyl)cyclohexane and 500 parts by mass of ortho dichlorobenzene, and the mixed solution was added into the flask over 30 minutes. During this time, the temperature in the flask was maintained at 30° C. or below. After completion of the addition, a white slurry-like liquid was formed in the flask. Again, the reaction temperature was increased to 150° C. with introducing phosgene, and the reaction was continued at 150° C. for 5 hours. The reaction solution in the flask became a pale-brown transparent liquid. After completion of the reaction, nitrogen gas was introduced at a temperature of 100 to 150° C. at a flow rate of 10 L/hour for degassing. The ortho dichlorobenzene solvent was distilled away under reduced pressure and a fraction having a boiling point of 138 to 140° C./0.7 KPa was further collected by vacuum distillation. Thus, 123 parts by mass (90% yield) of 1,4-bis(isocyanatomethyl)cyclohexane was obtained in the form of a colorless and transparent liquid. The resulting 1,4-bis(isocyanatomethyl)cyclohexane had a purity, which was determined by gas chromatography, of 99.9%, a hue of 5 in APHA, and a trans-isomer/cis-isomer ratio, which was determined by $^{13}$C-NMR, of 93/7. Hereinafter, 1,4-bis(isocyanatomethyl)cyclohexane having a trans-isomer/cis-isomer ratio of 93/7 is referred to as "BIC93".

Preparation Example 2

1,4-bis(isocyanatomethyl)cyclohexane was prepared in the same manner as Preparation Example 1 except that 1,4-bis(aminomethyl)cyclohexane (manufactured by Tokyo Chemical Industry Co., Ltd.) having a trans-isomer/cis-isomer ratio of 41/59 determined by $^{13}$C-NMR was used as a raw material. The obtained 1,4-bis(isocyanatomethyl)cyclohexane had a purity, determined by gas chromatography, of 99.9%, a hue of 5 in APHA, and a trans-isomer/cis-isomer ratio, determined by $^{13}$C-NMR, of 41/59. Hereinafter, 1,4-bis(isocyanatomethyl)cyclohexane having a trans-isomer/cis-isomer ratio of 41/59 is referred to as "BIC41".

Preparation Example 3

BIC93 and BIC41 were mixed in a ratio of 86.5:13.5 to prepare 1,4-bis(isocyanatomethyl)cyclohexane having a trans-isomer/cis-isomer ratio of 86/14. Hereinafter, 1,4-bis(isocyanatomethyl)cyclohexane having a trans-isomer/cis-isomer ratio of 86/14 is referred to as "BIC86".

Preparation Example 4

BIC93 and BIC41 were mixed in a ratio of 69.2:30.8 to prepare 1,4-bis(isocyanatomethyl)cyclohexane having a trans-isomer/cis-isomer ratio of 77/23. Hereinafter, 1,4-bis(isocyanatomethyl)cyclohexane having a trans-isomer/cis-isomer ratio of 77/23 is referred to as "BIC77".

Preparation Example 5

1,3-bis(isocyanatomethyl)cyclohexane was prepared in the same manner as Preparation Example 1 except that 1,3-bis(aminomethyl)cyclohexane (manufactured by Tokyo Chemical Industry Co., Ltd.) having a trans-isomer/cis-isomer ratio of 74/26 determined by $^{13}$C-NMR was used as a raw material. The obtained 1,3-bis(isocyanatomethyl)cyclohexane had a purity, determined by gas chromatography, of 99.9%, a hue of 5 in APHA, and a trans-isomer/cis-isomer ratio, determined by $^{13}$C-NMR, of 74/26. Hereinafter, 1,3-bis(isocyanatomethyl)cyclohexane having a trans-isomer/cis-isomer ratio of 74/26 is referred to as "BIC74".

[Synthesis of Polyurethane Elastomer]

Polyurethane elastomers having the compositions shown in Table 1 were synthesized as follows. First, polytetramethylene ether glycol (PTMG2000) heated at the temperature of 80° C. was added to bis(isocyanatomethyl)cyclohexane (BIC) heated at the temperature of 80° C. Then, dibutyl tin dilaurate (available from Aldrich, Inc.) of 0.005 mass % of the total amount of the raw materials (BIC, PTMG2000, and BD) was added thereto. Then, the mixture was stirred at the temperature of 80° C. for 2 hours under a nitrogen gas flow. Under a nitrogen gas flow, 1,4-butane diol (BD) heated at the temperature of 80° C. was added to the mixture, and the mixture was stirred at the temperature of 80° C. for 1 minute. Then, the reaction liquid was cooled, and degassed under the reduced pressure for 1 minute at the room temperature. After the degassing, the reaction liquid was spread in a container, kept at the temperature of 110° C. for 6 hours under a nitrogen gas atmosphere to carry out a chain extension, thereby obtaining polyurethane elastomers.

TABLE 1

| Polyurethane elastomer composition | M.W. | PU86-1 | PU86-2 | PU86-3 | PU86-4 | PU86-5 | PU77 | PU74 |
|---|---|---|---|---|---|---|---|---|
| BIC86 | 194 | 0.98 | 1.13 | 1.41 | 0.51 | 0.55 | — | — |
| BIC77 | 194 | — | — | — | — | — | 1.35 | — |
| BIC74 | 194 | — | — | — | — | — | — | 1.41 |
| PTMG2000 | 2000 | 0.5 | 0.5 | 0.5 | 0.5 | 0.5 | 0.5 | 0.5 |
| BD | 90 | 0.48 | 0.63 | 0.91 | 0.01 | 0.05 | 0.84 | 0.90 |
| Trans-isomer ratio (mole %) | — | 86 | 86 | 86 | 86 | 86 | 77 | 74 |
| Hardness (JIS-A/Shore D) | — | 85/32 | 90/40 | 95/46 | 70/20 | 73/22 | 90/40 | 90/40 |

Polyurethane composition: molar ratio,
M.W.: Molecular weight
BIC86: 1,4-bis(isocyanatomethyl)cyclohexane (trans-isomer: 86 mole %)
BIC77: 1,4-bis(isocyanatomethyl)cyclohexane (trans-isomer: 77 mole %)
BIC74: 1,3-bis(isocyanatomethyl)cyclohexane (trans-isomer: 74 mole %)
PTMG2000: Polytetramethyleneethergolycol (number average molecular weight: 2000) available from BASF Japan Co.
BD: 1,4-butane diol available from Tokyo chemical industry Co., Ltd.

[Production of the Spherical Body (Core)]

The polyurethane elastomer obtained as described above is extruded in the strand form into the cold water with a twin-screw kneading extruder. The extruded strand was cut with a pelletizer to prepare a golf ball polyurethane composition in the form of pellet. Extrusion was performed in the following conditions: screw diameter=45 mm; screw revolutions=200 rpm; and screw L/D=35. The mixtures were heated to a temperature in a range from 160° C. to 230° C. at a die position of the extruder. The obtained golf ball polyurethane composition in the form of pellet was injection molded at a temperature of 220° C. to prepare a spherical body (core) having a diameter of 40 mm.

TABLE 2

| | | Spherical body No. | | | | | | | |
|---|---|---|---|---|---|---|---|---|---|
| | | 1 | 2 | 3 | 4 | 5 | 6 | 7 | 8 |
| Polyurethane (PU) elastomer | PU86-1 | 100 | — | — | — | — | — | — | — |
| | PU86-2 | — | 100 | — | — | — | 70 | 50 | 30 |
| | PU86-3 | — | — | 100 | — | — | — | — | — |
| | PU86-4 | — | — | — | 100 | — | — | — | — |
| | PU86-5 | — | — | — | — | 100 | — | — | — |
| | PU77 | — | — | — | — | — | — | — | — |
| | PU74 | — | — | — | — | — | — | — | — |
| | Elastollan ET885 | — | — | — | — | — | — | — | — |
| | Elastollan 1190ATR | — | — | — | — | — | 30 | 50 | 70 |
| | Elastollan 1195ATR | — | — | — | — | — | — | — | — |
| | Elastollan NY85A | — | — | — | — | — | — | — | — |
| | Elastollan NY95A | — | — | — | — | — | — | — | — |
| PU composition | Rebound resilience (%) | 67 | 60 | 54 | 57 | 71 | 58 | 56 | 52 |
| | JIS-A hardness | 85 | 90 | 95 | 70 | 73 | 90 | 90 | 90 |
| | Shore D hardness | 32 | 40 | 46 | 20 | 22 | 40 | 40 | 40 |
| | Melt viscosity (Pa·s/190° C.) | 9000 | 5100 | 3200 | 12000 | 10000 | 5300 | 4900 | 4800 |
| | E' (×10$^7$ Pa) | 1.05 | 3.12 | 7.06 | 0.21 | 0.27 | 3.21 | 3.12 | 3.15 |
| | E" (×10$^7$ Pa) | 0.11 | 0.48 | 1.49 | 0.18 | 0.05 | 0.50 | 0.88 | 1.45 |
| | Log (E'/E"$^2$) | −5.07 | −5.86 | −6.50 | −6.19 | −5.03 | −5.89 | −6.39 | −6.82 |
| Coefficient of Restitution | | 0.799 | 0.769 | 0.708 | 0.739 | 0.828 | 0.749 | 0.728 | 0.687 |
| Compression deformation amount (index) | | 0.99 | 0.58 | 0.44 | 2.43 | 2.22 | 0.58 | 0.58 | 0.57 |
| Shot feeling | | E | E | G | E | E | E | E | E |

| | | Spherical body No. | | | | | | |
|---|---|---|---|---|---|---|---|---|
| | | 9 | 10 | 11 | 12 | 13 | 14 | 15 |
| Polyurethane (PU) elastomer | PU86-1 | — | — | — | — | — | — | — |
| | PU86-2 | — | — | — | — | — | — | — |
| | PU86-3 | — | — | — | — | — | — | — |
| | PU86-4 | — | — | — | — | — | — | — |
| | PU86-5 | — | — | — | — | — | — | — |
| | PU77 | 100 | — | — | — | — | — | — |
| | PU74 | — | 100 | — | — | — | — | — |
| | Elastollan ET885 | — | — | 100 | — | — | — | — |
| | Elastollan 1190ATR | — | — | — | 100 | — | — | — |
| | Elastollan 1195ATR | — | — | — | — | 100 | — | — |
| | Elastollan NY85A | — | — | — | — | — | 100 | — |
| | Elastollan NY95A | — | — | — | — | — | — | 100 |
| PU composition | Rebound resilience (%) | 56 | 51 | 53 | 47 | 41 | 37 | 32 |
| | JIS-A hardness | 90 | 90 | 85 | 90 | 95 | 85 | 95 |
| | Shore D hardness | 40 | 40 | 32 | 40 | 46 | 32 | 46 |
| | Melt viscosity (Pa·s/190° C.) | 4360 | 3350 | 5800 | 5500 | 4200 | 10500 | 4500 |
| | E' (×10$^7$ Pa) | 3.22 | 3.12 | 1.07 | 3.09 | 6.78 | 1.07 | 7.20 |
| | E" (×10$^7$ Pa) | 1.05 | 1.46 | 0.62 | 1.80 | 2.50 | 1.79 | 4.20 |
| | Log (E'/E"$^2$) | −6.53 | −6.83 | −6.56 | −7.02 | −6.96 | −7.48 | −7.39 |
| Coefficient of Restitution | | 0.728 | 0.677 | 0.697 | 0.636 | 0.574 | 0.533 | 0.481 |
| Compression deformation amount (index) | | 0.58 | 0.58 | 1.00 | 0.58 | 0.44 | 1.00 | 0.44 |
| Shot feeling | | E | E | E | E | G | E | G |

The materials used in Table 2 are follows.
Elastollan ET885: MDI-polyether type polyurethane elastomer having JIS-A hardness of 85 available from BASF Japan Co.
Elastollan 1190ATR: MDI-polyether type polyurethane elastomer having JIS-A hardness of 90 available from BASF Japan Co.
Elastollan 1195ATR: MDI-polyether type polyurethane elastomer having JIS-A hardness of 95 available from BASF Japan Co.
Elastollan NY85A: H$_{12}$MDI-polyether type polyurethane elastomer having JIS-A hardness of 85 available from BASF Japan Co.
Elastollan NY95A: H$_{12}$MDI-polyether type polyurethane elastomer having JIS-A hardness of 95 available from BASF Japan Co.

As is apparent from Table 2, the golf ball polyurethane composition comprising, as a resin component, a polyurethane elastomer including a polyisocyanate with one alicyclic hydrocarbon structure having 3 or more carbon atoms as a constituting component, and having a storage modulus E' (Pa) and a loss modulus E" (Pa) satisfying the following expression;

$$\log(E'/E''^2) \geq -6.53$$

when measured in a tensile mode using a dynamic viscoelasticity measuring apparatus has high resilience. Further, the golf ball polyurethane composition was injection molded without any difficulty.

FIG. 1 is a graph showing a relation between coefficient of restitution and log (E'/E"$^2$) of spherical bodies No. 1 to No. 15. The graph showed that the coefficient of restitution increased as log (E'/E"$^2$) became larger.

According to the present invention, the golf ball with an excellent resilience and shot feeling is obtained. This application is based on Japanese Patent Application No. 2011-183082 filed on Aug. 24, 2012, the contents of which are hereby incorporated by reference.

What is claimed is:
1. A golf ball comprising a constituting member formed from a golf ball polyurethane composition comprising, as a resin component, a polyurethane elastomer comprising 1,4-bis(isocyanatomethyl)cyclohexane containing a trans isomer in a content of 77 mole % or more and a polyol component having a number average molecular weight ranging from 2,000 to 3,000, and having a storage modulus E' (Pa) and a loss modulus E" (Pa) satisfying a following expression;

$$\log(E'/E''^2) \geq -6.53$$

when measured in a tensile mode using a dynamic viscoelasticity measuring apparatus, and wherein the golf ball polyurethane composition has a slab hardness ranging from 18 to 22 in Shore D hardness.

2. The golf ball according to claim 1, wherein the resin component of the golf ball polyurethane composition contains the polyurethane elastomer in a content of 50 mass % or more.

3. The golf ball according to claim 1, wherein the 1,4-bis(isocyanatomethyl)cyclohexane contains the trans isomer in a content of 80 mole % or more.

4. The golf ball according to claim 1, wherein the polyurethane elastomer contains polytetramethylene ether glycol as the polyol component, and 1,4-butanediol as a chain extender component.

5. The golf ball according to claim 1, wherein the golf ball polyurethane composition has rebound resilience of 54% or more.

6. The golf ball according to claim 1 comprising a one-piece golf ball body as the constituting member, wherein the one-piece golf ball body is formed from the golf ball polyurethane composition.

7. The golf ball according to claim 1, wherein the golf ball comprises a core composed of at least one layer and a cover covering the core as the constituting member and at least one layer of the core is formed from the golf ball polyurethane composition.

8. A golf ball comprising a one-piece golf ball body formed from a golf ball polyurethane composition comprising, as a resin component, a polyurethane elastomer comprising 1,4-bis(isocyanatomethyl)cyclohexane containing a trans isomer in a content of 77 mole % or more, and having a storage modulus E' (Pa) and a loss modulus E" (Pa) satisfying a following expression;

$$\log(E'/E''^2) \geq -6.53$$

when measured in a tensile mode using a dynamic viscoelasticity measuring apparatus, and wherein the golf ball polyurethane composition has a slab hardness ranging from 18 to 22 in Shore D hardness.

9. The golf ball according to claim 8, wherein the resin component of the golf ball polyurethane composition contains the polyurethane elastomer in a content of 50 mass % or more.

10. The golf ball according to claim 8, wherein the 1,4-bis(isocyanatomethyl)cyclohexane contains the trans isomer in a content of 80 mole % or more.

11. The golf ball according to claim 8, wherein the polyurethane elastomer contains polytetramethylene ether glycol having a number average molecular weight ranging from 1,000 to 3,000 as a polyol component, and 1,4-butanediol as a chain extender component.

12. The golf ball according to claim 8, wherein the golf ball polyurethane composition has rebound resilience of 54% or more.

* * * * *